United States Patent Office 3,398,194
Patented Aug. 20, 1968

3,398,194
PROCESS FOR MANUFACTURE OF 2,4-DINITRO-BENZENE DERIVATIVES
Semen Semenovich Gitis, Tulskoi oblasti, ulitsa Parkovaya 30/29, kv. 22, and Arkady Vasilievich Ivanov, Tulskoi oblasti, ulitsa Chapaeva 12-a, kv. 18, both of Novomoskovsk, U.S.S.R.
No Drawing. Filed June 8, 1965, Ser. No. 463,471
11 Claims. (Cl. 260—577)

ABSTRACT OF THE DISCLOSURE

A process for producing 2,4-dinitrophenol and a 2,4-dinitrobenzene derivative substituted in the 1-position by a member of the group consisting of $-NH_2$, $-OR$, $-NHR$ and $-N(R)_2$, wherein R is a lower alkyl group. The process comprises reacting 2,2',4,4'-tetranitrodiphenyl ether in an organic solvent with a compound selected from the group consisting of $NH_3$, a lower alkali alkoxide, a lower alkyl amine and a lower dialkylamine at a temperature of at least room temperature, after which the dinitrobenzene derivative is separated from the solution and the 2,4-dinitrophenol is recovered from the mother liquor.

---

This invention relates to a process for preparing derivatives of 2,4-dinitrobenzene containing in the 1-position various substituents such as $-OH$, $-NH_2$, $-OR$, $-NHR$, or $-N(R)_2$, wherein R is an alkyl group.

There is known in the art a method for the manufacture of 2,4-dinitrobenzene derivatives which comprises reacting 2,4-dinitrochlorobenzene with alkalis, ammonia, alkoxides, alkylamines or dialkylamines at elevated temperature for several hours. However, this method suffers from a number of disadvantages, among which mention should be made of the fact that 2,4-dinitrochlorobenzene is a toxic substance which causes skin diseases in the operating personnel. Moreover, 2,4-dinitrochlorobenzene used as the starting material is always contaminated with 2,6-dinitrochlorobenzene formed as a by-product in the nitration of chlorobenzene, said 2,6-isomer being difficult to separate from the principal product of nitration, so that the quality of dyestuffs prepared by treating said mixture is effected adversely by the presence of the 2,6-isomer. The formation of by-products in the course of treating the mixture of isomers results in the contamination of the product compound and requires additional purification.

It is an object of the present invention to replace toxic 2,4-dinitrochlorobenzene with other starting compounds devoid of said toxic properties.

It is another object of the present invention to simplify the process of preparing derivatives of 2,4-dinitrobenzene.

A further object of the invention is to eliminate the formation of undesirable by-products.

According to the present invention these objects are accomplished by a process which comprises using 2,2',4,4'-tetranitrodiphenyl ether as the starting material and reacting said compound in an organic solvent with an alkali alkoxide, ammonia, an alkylamine, or a dialkylamine for a period of 5 to 15 minutes at room temperature.

The derivative of 2,4-dinitrobenzene thus obtained is filtered off and dried, and the mother liquor is made slightly acidic with hydrochloric acid and cooled to cause 2,4-dinitrophenol to separate.

To obtain 2,4-dinitroaniline with the concomitant formation of 2,4-dinitrophenol, recourse can be had to 25% aqueous ammonia, the reaction being carried out at a temperature of 100° C. and a pressure of 4 to 5 kg./cm.²

The process of the present invention makes it possible to avoid the formation of undesirable by-products, so that the product compounds are obtained without need for recrystallization, in a high state of purity and the physical properties of the products agree with those given in the literature.

An added advantage of the present process is that it involves no health hazards to the operating personnel and also requires a shorter time for its accomplishment than prior art procedures.

In order to enable those skilled in the art to better understand the present invention, the following examples are given by way of illustration.

Example 1

To a solution of 1 g. (0.0028 mole) of 2,2',4,4'-tetranitrodiphenyl ether in 10 ml. of dimethylformamide at room temperature is added potassium methoxide.

To prepare potassium methoxide 0.8 g. (0.014 mole) of potassium is dissolved in 5 ml. of methanol.

The reaction mixture is maintained at room temperature for 5 to 10 minutes and then poured into 50–75 ml. of water. The precipitate of 2,4-dinitroanisole thus obtained is allowed to coagulate and is then filtered off and dried.

The yield of 2,4-dinitroanisole is 0.54 g. (95%); M.P., 88–88.5° C.

The filtrate is made slightly acidic and the resultant precipitate of 2,4-dinitrophenol is filtered off.

The yield is 0.4 g. (76%); M.P., 113–114° C.

Example 2

Gaseous ammonia from a cylinder is passed for a period of 15 minutes through a solution containing 1 g. (0.0028 mole) of 2,2',4,4'-tetranitrodiphenyl ether in 10 ml. of dimethylformamide at room temperature. The reaction mixture is then poured into 50–75 ml. of water, and the precipitate of 2,4-dinitroaniline thus formed is allowed to coagulate, after which it is filtered off and dried.

The yield of 2,4-dinitroaniline is 0.45 g. (85%); M.P., 178–179° C.

The filtrate is made slightly acidic and the precipitate of 2,4-dinitrophenol thus obtained is filtered off.

The yield is 0.34 g. (65%); M.P. 113–113.5° C.

Example 3

To a solution of 1 g. (0.0028 mole) of 2,2',4,4'-tetranitrodiphenyl ether in 10 ml. of dimethylformamide at room temperature is added 0.76 g. (0.0084 mole) of a 50% aqueous solution of monoethylamine.

The reaction mixture is maintained at room temperature for 20 minutes and is then poured into 50–75 ml. of water. The precipitate of 2,4-dinitro-N-ethylaniline thus formed is allowed to coagulate, after which it is filtered off and dried.

The yield of 2,4-dinitro-N-ethylaniline is 0.58 g. (96%); M.P. 113–114° C.

The filtrate is made slightly acidic and the precipitate of 2,4-dinitrophenol obtained is filtered off.

The yield is 0.4 g. (76%); M.P., 113–113.5° C.

Example 4

To a solution of 1 g. (0.0028 mole) of 2,2',4,4'-tetranitrodiphenyl ether in 10 ml. of dimethylformamide at room temperature is added 1.16 g. (0.0084 mole) of a 33% aqueous solution of dimethylamine.

The reaction mixture is maintained at room temperature for 15 minutes and is then poured into 50–75 ml. of water. The precipitate of 2,4-dinitro-N,N-dimethylaniline thus obtained is allowed to coagulate and is then filtered off and dried.

The yield of 2,4-dinitro-N,N-dimethylaniline is 0.58 g. (96%); M.P., 87° C.

The filtrate is made slightly acidic and the precipitate of 2,4-dinitrophenol formed is filtered off.

The yield is 0.44 g. (82%); M.P., 113–113.5° C.

Similar results are obtained by passing dimethylamine gas through a solution of 2,2',4,4'-tetranitrodiphenyl ether in dimethylformamide.

Example 5

To a solution of 0.5 g. (0.0014 mole) of 2,2'4,4'-tetranitrodiphenyl ether in 10 ml. of dimethylformamide is added 0.28 g. (0.0042 mole) of a 25% aqueous ammonia. The reaction mixture contained in a metal ampoule is maintained for 15 minutes at a temperature of 100° C. and under a pressure of 4 to 5 kg./cm$^2$. The reaction mixture is then poured into 50 ml. of water. The precipitate of 2,4-dinitroaniline thus obtained is allowed to coagulate and is then filtered off and dried.

The yield of 2,4-dinitroaniline is 0.23 g. (90%); M.P., 177–178° C.

The filtrate is made slightly acidic and the precipitate of 2,4-dinitrophenol formed is filtered off.

The yield is 0.17 g. (65%); M.P., 113–114° C.

We claim:

1. A process for the preparation of 2,4-dinitrophenol and a 2,4-dinitrobenzene derivative substituted in the 1-position by a group selected from the class consisting of $NH_2$, OR, NHR, and $N(R)_2$, wherein R is a lower alkyl group, said process comprising reacting 2,2',4,4'-tetranitrodiphenyl ether in an organic solvent with a compound selected from the group consisting of ammonia, a alkali lower alkoxide, a lower alkylamine and a lower dialkylamine at a temperature of at least room temperature and separating the products.

2. A process according to claim 1, wherein the organic solvent is dimethylformamide.

3. A process according to claim 1, wherein said compound is potassium methoxide and the 2,4-dinitrobenzene derivative is 2,4-dinitroanisole.

4. A process according to claim 1, wherein said compound is ammonia, the 2,4-dinitrobenzene derivative is 2,4-dinitroaniline and reacting is effected at a temperature of up to 100° C. and a pressure of up to 5 atm.

5. A process according to claim 4, wherein the ammonia is a 25% aqueous ammonia solution, the temperature is about 100° C., the pressure is 4–5 atm., and the organic solvent is dimethylformamide.

6. A process according to claim 1, wherein said compound is monoethylamine and the 2,4-dinitrobenzene derivative is 2,4-dinitromonoethylaniline.

7. A process according to claim 6, wherein the monoethylamine is a 50% aqueous ethylamine solution.

8. A process according to claim 7, wherein the organic solvent is dimethylformamide.

9. A process according to claim 1, wherein said compound is dimethylamine and the 2,4-dinitrobenzene derivative is 2,4-dinitrodimethylaniline.

10. A process according to claim 9, wherein the dimethylamine is a 33% aqueous dimethylamine solution.

11. A process according to claim 10, wherein the organic solvent is dimethylformamide.

No references cited.

CHARLES B. PARKER, *Primary Examiner.*

P. C. IVES, *Assistant Examiner.*